(12) United States Patent
Mitsuyasu et al.

(10) Patent No.: US 11,728,046 B2
(45) Date of Patent: Aug. 15, 2023

(54) FUEL ASSEMBLY

(71) Applicant: Hitachi-GE Nuclear Energy, Ltd., Ibaraki (JP)

(72) Inventors: Takeshi Mitsuyasu, Tokyo (JP); Motoo Aoyama, Tokyo (JP)

(73) Assignee: HITACHI-GE NUCLEAR ENERGY, LTD., Hitachi (JP)

( * ) Notice: Subject to any disclaimer, the term of this patent is extended or adjusted under 35 U.S.C. 154(b) by 579 days.

(21) Appl. No.: 16/360,059

(22) Filed: Mar. 21, 2019

(65) Prior Publication Data

US 2020/0027584 A1 Jan. 23, 2020

(30) Foreign Application Priority Data

Mar. 30, 2018 (JP) .............................. JP2018-066985

(51) Int. Cl.
*G21C 3/326* (2006.01)
*G21C 3/26* (2006.01)
(Continued)

(52) U.S. Cl.
CPC .............. *G21C 3/326* (2013.01); *G21C 3/26* (2013.01); *G21C 3/332* (2013.01); *G21C 3/3305* (2013.01);
(Continued)

(58) Field of Classification Search
CPC ....... G21C 3/326; G21C 3/3225; G21C 3/328
See application file for complete search history.

(56) References Cited

U.S. PATENT DOCUMENTS 5,383,229 A * 1/1995 Nakajima .............. G21C 3/328
376/434
5,388,132 A * 2/1995 Aoyama ................ G21C 3/328
376/435
(Continued)

FOREIGN PATENT DOCUMENTS

JP H0636049 B2 * 5/1994
JP 7-301688 A 11/1995
(Continued)

OTHER PUBLICATIONS

Japanese Office Action received in corresponding Japanese Application No. 2018-066985 dated Jun. 22, 2021.
(Continued)

*Primary Examiner* — Jack W Keith
*Assistant Examiner* — Joshua C Devorkin
(74) *Attorney, Agent, or Firm* — Mattingly & Malur, PC

(57) ABSTRACT

A fuel assembly includes full length fuel rods which contain a plutonium fissile (Puf) but do not contain a burnable poison, full length fuel rods which contain the fissile uranium and the burnable poison, and partial length fuel rods which contain Puf but do not contain the burnable poison in a channel box. The plutonium enrichment is decreased in an order of the full length fuel rods. The concentration of the burnable poison of the full length fuel rod is higher than the concentration of the full length fuel rod. In each side of a rectangular outermost periphery adjacent to the inner surface of the channel box in a horizontal cross-sectional view of the fuel assembly, two partial length fuel rods are adjacently disposed, and the full length fuel rod containing the burnable poison is disposed to be adjacent to each partial length fuel rod.

5 Claims, 13 Drawing Sheets

(51) Int. Cl.
   *G21C 3/33*      (2006.01)
   *G21C 3/332*     (2006.01)
   *G21C 3/34*      (2006.01)
   *G21C 3/58*      (2006.01)
(52) U.S. Cl.
   CPC ............ *G21C 3/3315* (2013.01); *G21C 3/34* (2013.01); *G21C 3/58* (2013.01)

(56) References Cited

U.S. PATENT DOCUMENTS

| | | | |
|---|---|---|---|
| 2009/0196392 A1* | 8/2009 | Miwa | G21C 3/326 376/353 |
| 2012/0063561 A1* | 3/2012 | Mitsuyasu | G21C 3/328 376/435 |

FOREIGN PATENT DOCUMENTS

| | | | |
|---|---|---|---|
| JP | 7-311291 A | | 11/1995 |
| JP | 2001-056388 A | | 2/2001 |
| JP | 2002-189094 A | | 7/2002 |
| JP | 2002189094 A | * | 7/2002 |
| JP | 2017-156291 A | | 9/2017 |

OTHER PUBLICATIONS

Communication of a Notice of Opposition received in corresponding European Application No. 19163051.6 dated Feb. 4, 2021.

* cited by examiner

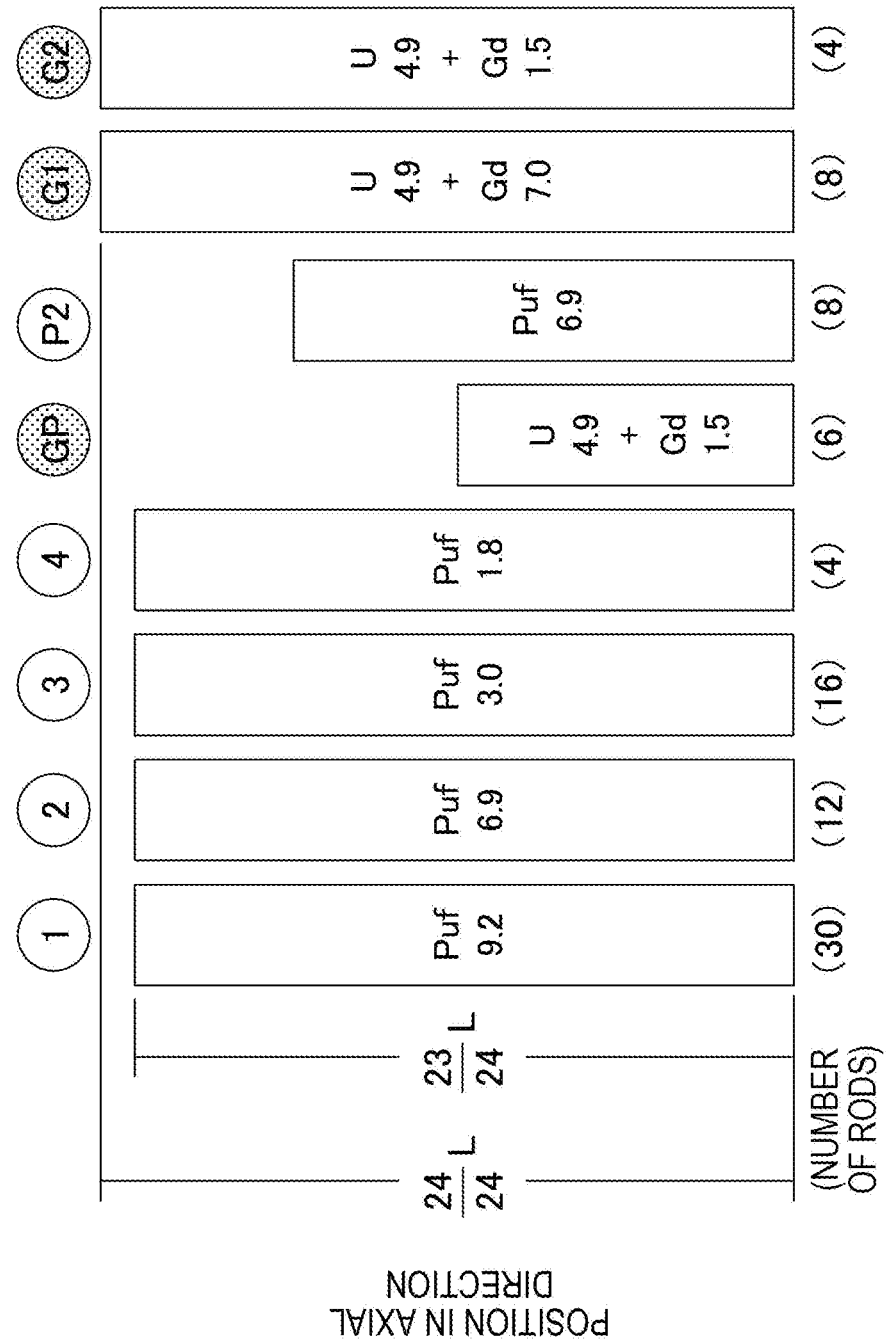

FUEL ASSEMBLY

CLAIM OF PRIORITY

The present application claims priority from Japanese Patent application serial No. 2018-066985, filed on Mar. 30, 2018, the content of which is hereby incorporated by reference into this application.

BACKGROUND OF THE INVENTION

1. Field of the Invention

The invention relates to a fuel assembly, and particularly to a fuel assembly which is suitable to a boiling-water reactor.

2. Description of the Related Art

In a reactor core of a boiling-water reactor, a plurality of fuel assemblies is loaded. The fuel assembly includes a plurality of fuel rods where a plurality of fuel pellets containing a nuclear fuel material (for example, uranium oxide) is sealed, an upper tie plate (upper fuel support member) which supports the upper end of the fuel rod, a lower tie plate (lower fuel support member) which supports the lower end of the fuel rod, a plurality of fuel spacers which holds a gap between the fuel rods, a water rod, and a square channel box of which the horizontal cross-sectional view is a square view. The channel box encloses the plurality of fuel rods which extends toward the lower tie plate while the upper ends are attached to the upper tie plate and bound by the plurality of fuel spacers disposed in an axial direction. The water rod is disposed at the center in the horizontal cross-sectional view of the fuel assembly. The plurality of fuel rods is disposed around the water rod. A lower end of the water rod is supported to the lower tie plate, and the upper end of the water rod is supported to the upper tie plate. Each fuel rod includes a fuel clad. A lower end of the fuel clad is sealed by a lower end plug to seal the upper end of the fuel clad using an upper end plug. The fuel clad is filled with plurality of fuel pellets containing the nuclear fuel material. In the fuel clad, a gas plenum is formed above of a region where these fuel pellets are filled.

A plurality of control rods is inserted in a reactor core to control the power of the nuclear reactor. In addition, some of the fuel rods in the fuel assembly are filled with the fuel pellet containing a burnable poison (for example, gadolinia containing gadolinium (Gd): $Gd_2O_3$). The control rod and the burnable poison absorb neutrons which are excessively generated by nuclear fission of the nuclear fuel material. The burnable poison is changed into a substance which hardly absorbs the neutrons by the absorption of neutrons. Therefore, the burnable poison contained in a new fuel assembly (a fuel assembly with a burnup of 0 GWd/t) loaded in the reactor core is reduced when a certain operation period of the nuclear reactor elapses after the new fuel assembly is loaded in the reactor core. The fuel assembly having the reduced burnable poison is monotonously reduced in reactivity as the burnup of the nuclear fuel material. In the reactor core, there is loaded the plurality of fuel assemblies having different number of operation cycles resident in the reactor core. Therefore, a critical state is kept through the operation period of the nuclear reactor of the whole reactor core.

A material such as plutonium (Pu) obtained by reprocessing uranium fuel contained in a spent fuel assembly which is taken out of the nuclear reactor is used as the nuclear fuel material. The fuel assembly obtained by molding the nuclear fuel material is called a MOX fuel assembly. The burnable poison is used also in the MOX fuel assembly. However, the reactor core loaded with the MOX fuel assembly has a high average energy of the neutrons (the energy spectrum of the neutrons becomes hard). Therefore, a neutrons absorption effect of the burnable poison becomes less. This phenomenon occurs even in the fuel assembly using the uranium fuel, and also in the nuclear fuel material having a high enrichment.

In addition, since the uranium is taken out by the reprocessing, there is no enrichment procedure to increase a plutonium enrichment unlike the uranium fuel. In other words, the MOX fuel assembly can be made enriched at a comparatively low cost. Therefore, the high enrichment using a high enriched MOX fuel assembly is effective to reduce the cost. However, if a uranium fuel rod containing the burnable poison is used as the MOX fuel assembly, the loading amount of plutonium in the MOX fuel assembly is reduced. Therefore, the MOX fuel assembly is hindered from being enriched. For this reason, the worth of the burnable poison is necessarily increased in order to suppress the number of uranium fuel rods containing the burnable poison at a minimum.

A saturated water region existing between the fuel assemblies has a water density higher than that in the inner region of the fuel assembly which causes voids. In order to increase the worth of the burnable poison, the fuel rod containing the burnable poison may be disposed in an outermost periphery adjacent to the saturated water region in the horizontal cross-sectional view of the fuel assembly. Further, considering a long period of operation cycle in addition to the increasing of the burnup of the fuel assembly, the concentration of the burnable poison in the fuel rod containing the burnable poison is necessarily increased. In the horizontal cross-sectional view of the fuel assembly, the fuel rod containing the burnable poison is disposed at a position where the spectrum of the neutrons is hard except the outermost periphery, so that the burnable poison in the fuel rod can be kept for a long period without being burnt out. However, the fuel rod containing the burnable poison is desirably disposed in the outermost periphery for the above reason. An additive amount of the burnable poison in the nuclear fuel material in the fuel rod is limited by a manufacturing performance of the fuel rod containing the burnable poison and a reduction in the thermal conductivity of the fuel rod containing the burnable poison.

In the MOX fuel assembly having a low enrichment, a void reactivity coefficient which is an index indicating a change in reactivity in a case where a void fraction in a coolant changes becomes negative. An absolute value of the void reactivity coefficient in the MOX fuel assembly of a low enrichment becomes larger than that of the fuel assembly which contains uranium but does not contain plutonium. Therefore, in a case where the void fraction is lower than an average void fraction at the time of operating the boiling-water nuclear power plant, the reactivity is added to the reactor core, and thus the increased amount of the reactivity at the time of being cooled and stopped is increased, and a reactor shutdown margin is lowered. Therefore, in general, the void reactivity coefficient in the MOX fuel assembly of a low enrichment is adjusted by the increase in the absorption amount of neutrons in the control rod and the increase in the additive amount of the burnable poison to the fuel assembly similarly to the related art.

Thus, JP 2002-189094 A and JP 2001-56388 A have proposed the techniques.

JP 2002-189094 A discloses a fuel assembly which is used in a boiling-water nuclear power plant. In the boiling-water nuclear power plant, one partial length fuel rod and two fuel rods containing the burnable poison which are adjacent to the partial length fuel rod are disposed in the outermost periphery in the horizontal cross-sectional view of the fuel assembly (FIG. 4). Further, one partial length fuel rod and two fuel rods containing the burnable poison which are adjacent to the partial length fuel rod are disposed around the water rod (FIG. 1). The outermost periphery in the horizontal cross-sectional view of the fuel assembly is a region where the plurality of fuel rods disposed to be adjacent to an inner surface of the channel box of the fuel assembly is disposed, and the fuel rods of the first row from the inner surface of the channel box exist. The length in the axial direction of the partial length fuel rod becomes shorter than the length of the fuel rod containing the burnable poison. In a region right above the partial length fuel rod, the nuclear fuel material is not disposed, the coolant containing the voids flows at the time of operating the boiling-water nuclear power plant, and the water at room temperature is filled therein at the time of stopping the boiling-water nuclear power plant. In such a fuel assembly, the region where the coolant flows around the fuel rod containing the burnable poison is expanded on the upper side rather than the upper end of the partial length fuel rod. In the region right above the partial length fuel rod, the thermal neutrons are differently generated at the time of operating the boiling-water nuclear power plant and at the time of stopping (cooling) the boiling-water nuclear power plant. With the configuration that the fuel rod containing the burnable poison is disposed to be adjacent to the partial length fuel rod, the fuel rod containing the burnable poison can also be disposed to be adjacent to the region right above the partial length fuel rod, the worth of the burnable poison in the fuel rod containing the burnable poison can be increased at the time of cooling, and the reactor shutdown margin can also be improved.

In addition, JP 2001-56388 A discloses, similarly to JP 2002-189094 A, a fuel assembly which is used in a boiling-water nuclear power plant, in which one partial length fuel rod and two fuel rods containing the burnable poison which are adjacent to the partial length fuel rod are disposed in the outermost periphery in the horizontal cross-sectional view of the fuel assembly (FIG. 1). In the fuel assembly disclosed in JP 2001-56388 A, one partial length fuel rod and two fuel rods containing the burnable poison which are adjacent to the partial length fuel rod are disposed in each of four sides of the outermost periphery of a square shape, and the partial length fuel rod is disposed at the center of each of four sides of the outermost periphery.

SUMMARY OF THE INVENTION

In JP 2002-189094 A, a partial length fuel rod and the fuel rod containing the burnable poison which is adjacent to the partial length fuel rod are disposed in the outermost periphery in the horizontal cross-sectional view of the fuel assembly so as to improve the reactor shutdown margin. The partial length fuel rod is generally configured such that the partial length fuel rod is disposed in the lower region of the fuel assembly and thus gives off heat in the lower region, and steam (void) is generated in the lower region by the partial length fuel rod. As a result, in the region right above the partial length fuel rod, the void fraction equivalent to the region around the partial length fuel rod is generated even though the fuel rod does not exist. The area of a flow passage of a moderator of the above region of the partial length fuel rod is larger than the surrounding region. Therefore, the number of water at the time of operating and the time of cooling of the boiling-water nuclear power plant is significantly changed. The neutrons moderated by the water at the time of cooling are easily absorbed to the adjacent fuel rod containing the burnable poison, so that the reactor shutdown margin is increased. This means that the worth of the burnable poison in the fuel rod containing the burnable poison is not increased at the time of operating in the fuel assembly illustrated in FIG. 4 of JP 2002-189094 A.

In addition, the fuel assembly disclosed in JP 2001-56388 A disposes the partial length fuel rod and the fuel rod containing the burnable poison which is adjacent to the partial length fuel rod at the center of each of four sides of the outermost periphery of a square shape. The thermal neutrons generated in the saturated water region which is formed between the fuel assemblies are increased most at each of four corners of the outermost periphery, and relatively less at the center of each one of four sides of the outermost periphery, but are increased compared to the inner portion of the channel box, so that the worth of the burnable poison at the time of operating is increased. However, a change in the worth of the burnable poison at the time of operating caused by the partial length fuel rod which is disposed to be adjacent is reduced. Further, in the saturated water region of the outer portion of the fuel assembly at the time of operating, no void is generated. Therefore, a difference in density of the water at the time of cooling is small. Therefore, the change in amount of generated thermal neutrons at the time of operating and at the time of cooling is small, and the effect of improving the reactor shutdown margin is reduced. However, similarly to JP 2002-189094 A, the partial length fuel rods are disposed to be adjacent to improve the reactor shutdown margin. In other words, in JP 2001-56388 A, the reactor shutdown margin has been tried to be improved further more by disposing the partial length fuel rod at the center of each of four sides of the outermost periphery of the fuel assembly. However, as described above, one fuel rod containing the burnable poison is disposed in each side of the outermost periphery of the fuel assembly from the viewpoint of the high worth of the burnable poison at the time of operating.

An object of the invention is to provide a fuel assembly which can increase the reactor shutdown margin and increase the worth of the burnable poison.

An aspect of the invention to solve the above problem provides a fuel assembly which includes a lower fuel support member, an upper fuel support member, a cylindrical channel box which has an upper end attached to the upper fuel support member, and extends toward the lower fuel support member, a plurality of first fuel rods, each of which has a lower end supported to the lower fuel support member and an upper end supported to the upper fuel support member, and contains a nuclear fuel material but does not contain a burnable poison, a plurality of second fuel rods, each of which has a lower end supported to the lower fuel support member and an upper end supported to the upper fuel support member, and contains the nuclear fuel material and the burnable poison, and a plurality of third fuel rods, each of which has a lower end supported to the lower fuel support member and an upper end not supported to the upper fuel support member, has a length in an axial direction shorter than the first fuel rod and the second fuel rod, and contains the nuclear fuel material but does not contain the burnable poison. The plurality of first fuel rods, the plurality of second fuel rods, and the plurality of third fuel rods are disposed on an inner side of the channel box. Two third fuel rods are brought to be adjacent, and disposed in an outermost periphery which is adjacent to an inner surface of the channel box in a horizontal cross-sectional view of the fuel assembly. The second fuel rod is disposed to be adjacent to at least one of two adjacent third fuel rods.

According to the invention, two third fuel rods are disposed to be adjacent in the outermost periphery, and at least one second fuel rod among the two third fuel rods which are disposed to be adjacent are disposed to be adjacent. Therefore, a void fraction of a coolant region between the two adjacent third fuel rods at the time of operating the nuclear power plant is significantly reduced. In this way, in the coolant region where the void fraction is lowered, the moderation of the neutrons is enhanced by moderation of the coolant, and a lot of thermal neutrons are generated. Therefore, it is possible to increase the worth of the burnable poison contained in the second fuel rod which is disposed to be adjacent to the third fuel rod. Further, at the time of the shutdown of the nuclear power plant, that is, at the time of cooling, the saturated water region is formed in a region right above the upper end of two third fuel rods which are adjacent in the outermost periphery. With the saturated water region, the saturated water region formed between the fuel assemblies is effectively extended. The saturated water region adjacent to the control rod in the reactor core is increased. Therefore, the reactor shutdown margin of the nuclear reactor is improved.

According to the invention, a reactor shutdown margin is increased, and a worth of a burnable poison can be increased.

BRIEF DESCRIPTION OF THE DRAWINGS

FIG. 14 is an explanatory diagram illustrating the plutonium fissile enrichment of each fuel rod of the fuel assembly illustrated FIG. 13 and the concentration of the burnable poison.

DESCRIPTION OF THE PREFERRED EMBODIMENTS

Figure 1:
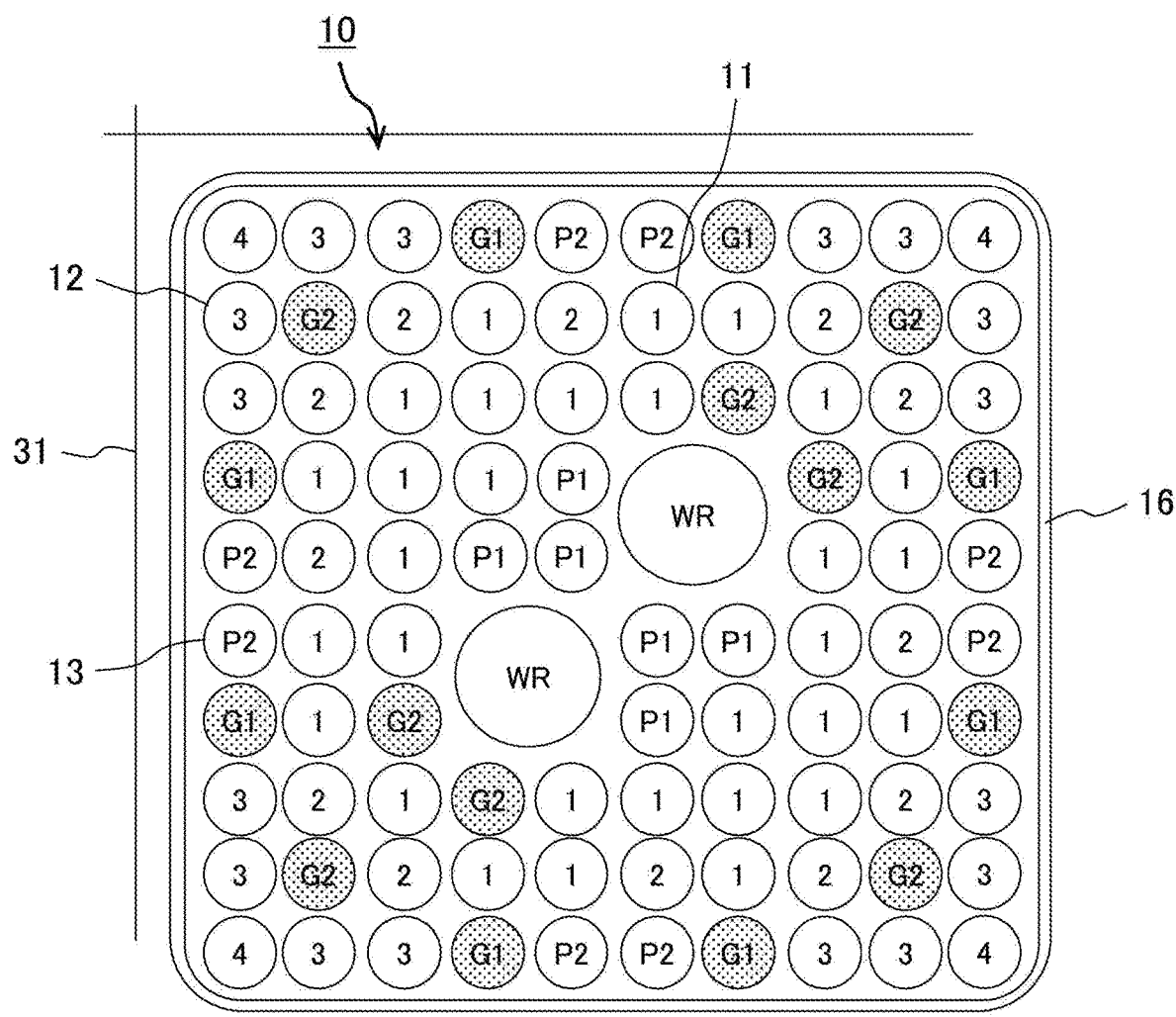
FIG. 1 is a horizontal cross-sectional view of a fuel assembly of a first embodiment applied to an advanced boiling-water nuclear power plant which is a preferred embodiment of the invention, which is a cross-sectional view taken along line I-I of FIG. 3.

The inventors have extensively studied to improve a reactor shutdown margin, and found out a new configuration which enhances the worth of a burnable poison. The outline of the studied results and the found fuel assembly will be described below.

There is a need to reduce the number of fuel rods containing the burnable poison as many as possible as descried above in order to increase the plutonium enrichment of the MOX fuel of a boiling-water reactor (BWR). Further, there is a need to increase the concentration of the burnable poison in order to extend an operation cycle. For example, gadolinium (Gd) used as the burnable poison is often used generally with a concentration of 10 wt % as an upper limit. The upper limit of the concentration is decided depending on a manufacturability of the fuel rod and a reduction in thermal conductivity of the fuel rod containing the burnable poison. In order to reduce the number of fuel rods containing the burnable poison, the fuel rod containing the burnable poison may be disposed at a position where a neutrons absorption effect is high. Therefore, the inventors of the invention disposed the fuel rod containing the burnable poison in an outermost periphery adjacent to the inner surface of a channel box of a horizontal cross-sectional view of the fuel assembly.

In general, in a MOX fuel assembly, the length of a gas plenum formed in the upper portion of the fuel rod filled with the plutonium fissile is set to be longer than the length of the gas plenum of the fuel rod which contains uranium but does not contain plutonium in order to suppress the fuel rod from being increased in internal pressure caused by gas generated at the time of nuclear fission of the plutonium fissile which is generated by neutron emission. The length in an axial direction of a active fuel length where the plutonium fissile exists is shortened in proportion to the length. In the MOX fuel assembly which includes the fuel rod where the plutonium fissile is filled and the fuel rod which contains uranium but does not contain plutonium, the length in the axial direction of the active fuel length of the former fuel rod is shorter than the length in the axial direction of the active fuel length of the latter fuel rod. However, the difference of the active fuel length in these fuel rods is equal to the length of a blanket which exists in the upper end of the latter fuel rod to dispose the natural uranium, so that there is less influence on the reactor core characteristic.

The fuel assembly such as the MOX fuel assembly includes a plurality of fuel rods (hereinafter, conveniently referred to as a full length fuel rod) of which the lower end is supported to a lower tie plate and the upper end is supported to an upper tie plate, and a plurality of partial length fuel rods of which the lower end is supported to the lower tie plate, the upper end is not supported to the upper tie plate, and the length in the axial direction is shorter than the length in the axial direction of the full length fuel rod. The partial length fuel rod provided in the fuel assembly reduces a pressure drop of the fuel assembly, and increases the amount of fuel load within the fuel assembly under the condition of the same pressure drop.

In order to increase a plutonium enrichment in the MOX fuel assembly, the partial length fuel rod may be disposed in the outermost periphery in the horizontal cross-sectional view of the fuel assembly. This is because, in a general MOX fuel assembly, the plutonium enrichment contained in the fuel rod disposed in the outermost periphery is set to be lower than an average value of the plutonium enrichment in the fuel assembly from the viewpoint of planarization of the power distribution in unit of the fuel rod in the horizontal cross-sectional view of the fuel assembly. Therefore, a nuclear fission reaction caused by the thermal neutrons generated in a saturated water region which exists between the fuel assemblies without void is suppressed. The fuel rod having a low plutonium enrichment used for the partial length fuel rod increases an average plutonium enrichment of the MOX fuel assembly as a result rather than using the fuel rod having a high plutonium enrichment in the fuel assembly as the partial length fuel rod.

Further, the inventors paid attention to a void fraction distribution on the upper side rather than the upper end of the partial length fuel rod in the fuel assembly near the outermost periphery at the time of operating the boiling-water nuclear power plant. The void fraction distribution of each of Case 1 and Case 2 will be described.

Figure 5:
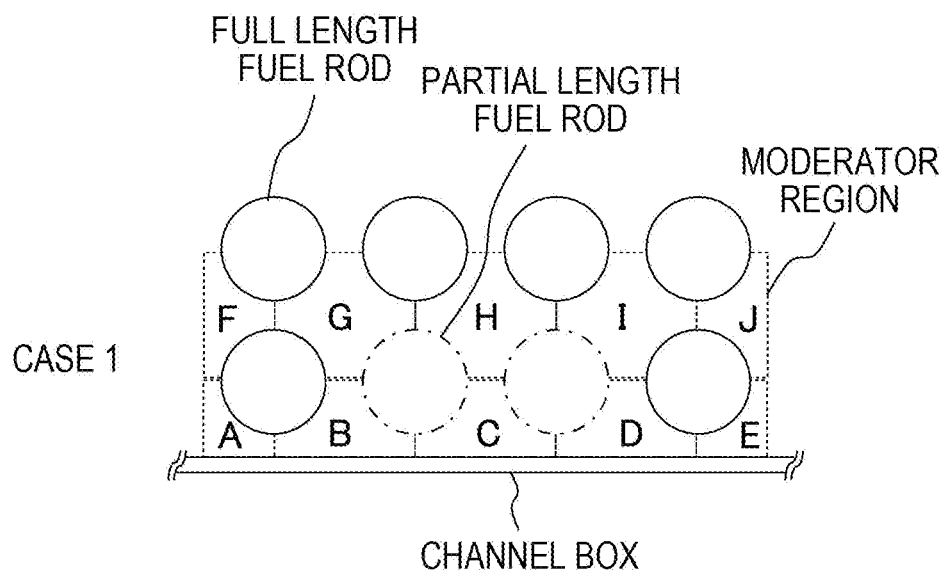
FIG. 5 is a diagram for describing a state (Case 1) in which two adjacent partial length fuel rods and two fuel rods (full length fuel rods) which are adjacent to these partial length fuel rods respectively and contain the burnable poison are disposed in an outermost periphery in a horizontal cross section of the fuel assembly.

In Case 1, a fuel assembly is a target in which two adjacent partial length fuel rods and two fuel rods (full length fuel rods) which are respectively adjacent to these partial length fuel rods and contain the burnable poison are disposed in the outermost periphery in the horizontal cross-sectional view of the fuel assembly (see FIG. 5). The fuel assembly of Case 1 corresponds to the fuel assembly of the invention. In Case 2, a fuel assembly is a target in which one partial length fuel rod and two fuel rods (full length fuel rods) which are adjacent to the partial length fuel rod and contain the burnable poison are disposed in the outermost periphery in the horizontal cross-sectional view of the fuel assembly (see FIG. 6). The fuel assembly of Case 2 corresponds to the fuel assembly disclosed in JP 2002-189094 A and JP 2001-56388 A.

Figure 6:
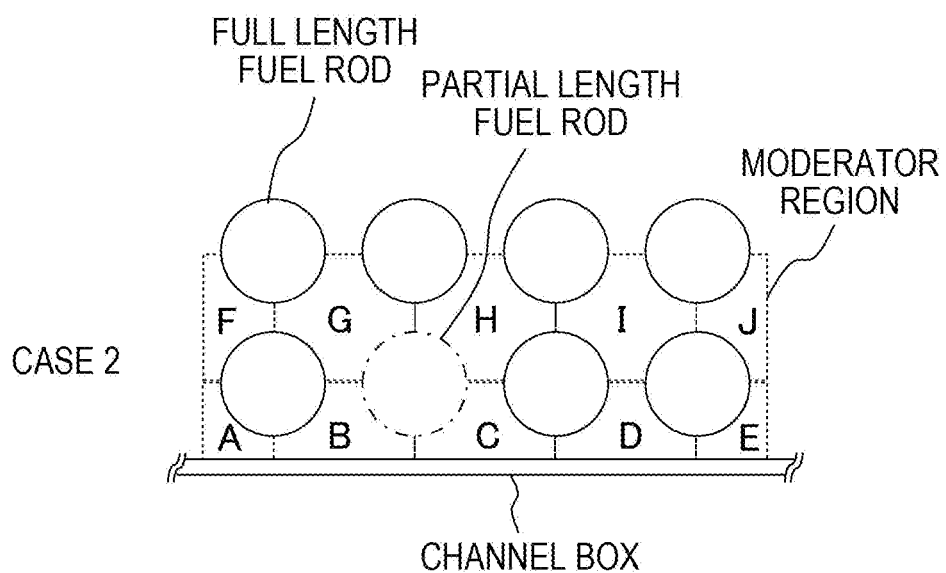
FIG. 6 is an explanatory diagram illustrating a state (Case 2) in which one partial length fuel rod and two fuel rods (full length fuel rods) which are adjacent to the partial length fuel rod and contain the burnable poison are disposed in the outermost periphery in the horizontal cross section of the fuel assembly.

A, B, C, D, and E denoted in FIGS. 5 and 6 illustrate moderator regions (coolant region) formed between the fuel rods in the outermost periphery between each fuel rod (each fuel rod disposed in the first row from the inner surface of the channel box) disposed in the outermost periphery and the inner surface of the channel box in the fuel assembly (see FIGS. 5 and 6). In addition, F, G, H, I, and J denoted in FIGS. 5 and 6 illustrate moderator regions (coolant region) formed between the fuel rods disposed in the second row between the fuel rod disposed in the outermost periphery and the fuel rod disposed in the second row from the inner surface of the channel box in the fuel assembly (see FIGS. 5 and 6).

Figure 7:
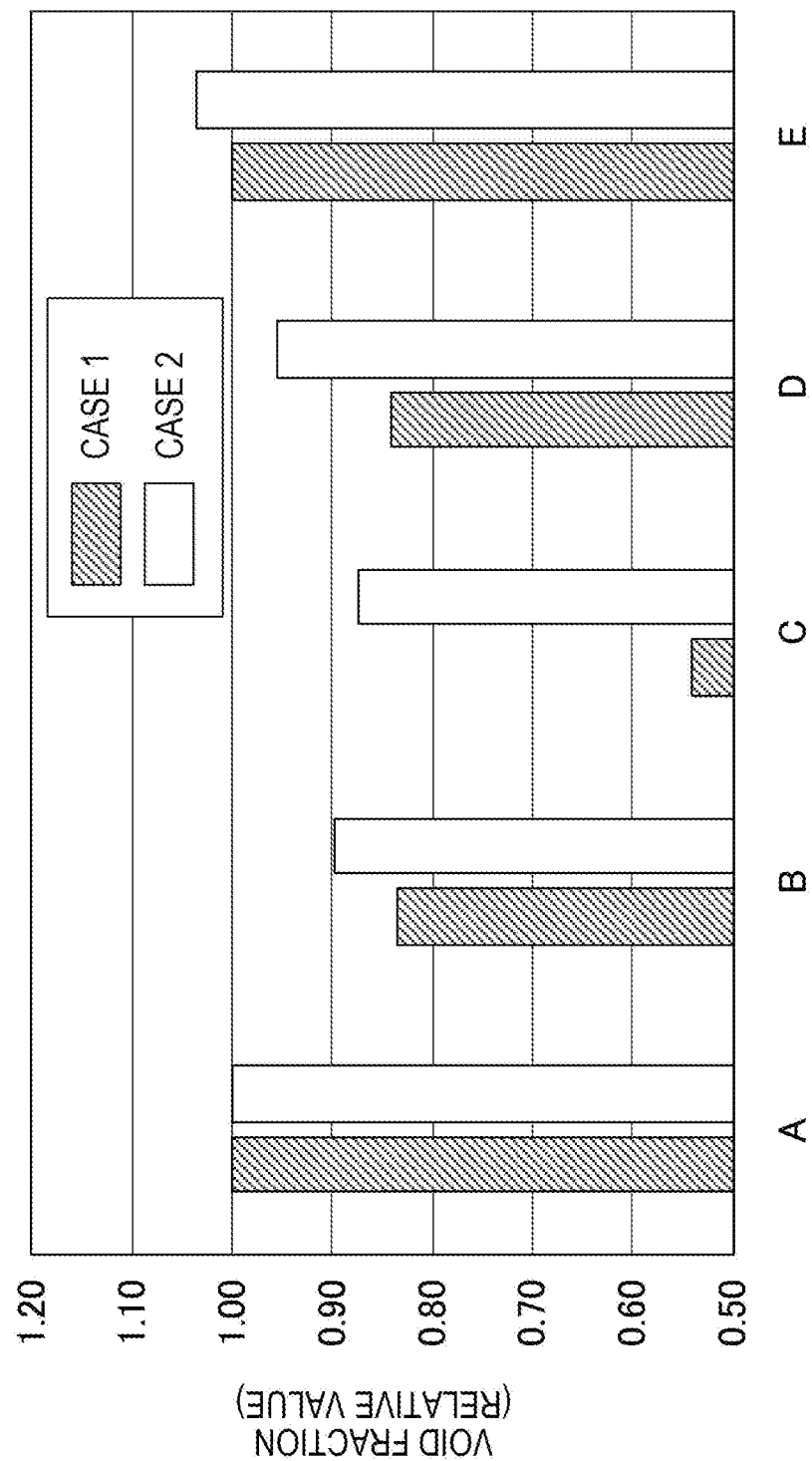
FIG. 7 is an explanatory diagram illustrating a void fraction distribution between each fuel rod disposed in the outermost periphery in the horizontal cross section of the fuel assembly and a channel box with respect to Case 1 illustrated in FIG. 5 and Case 2 illustrated in FIG. 6.
Figure 8:
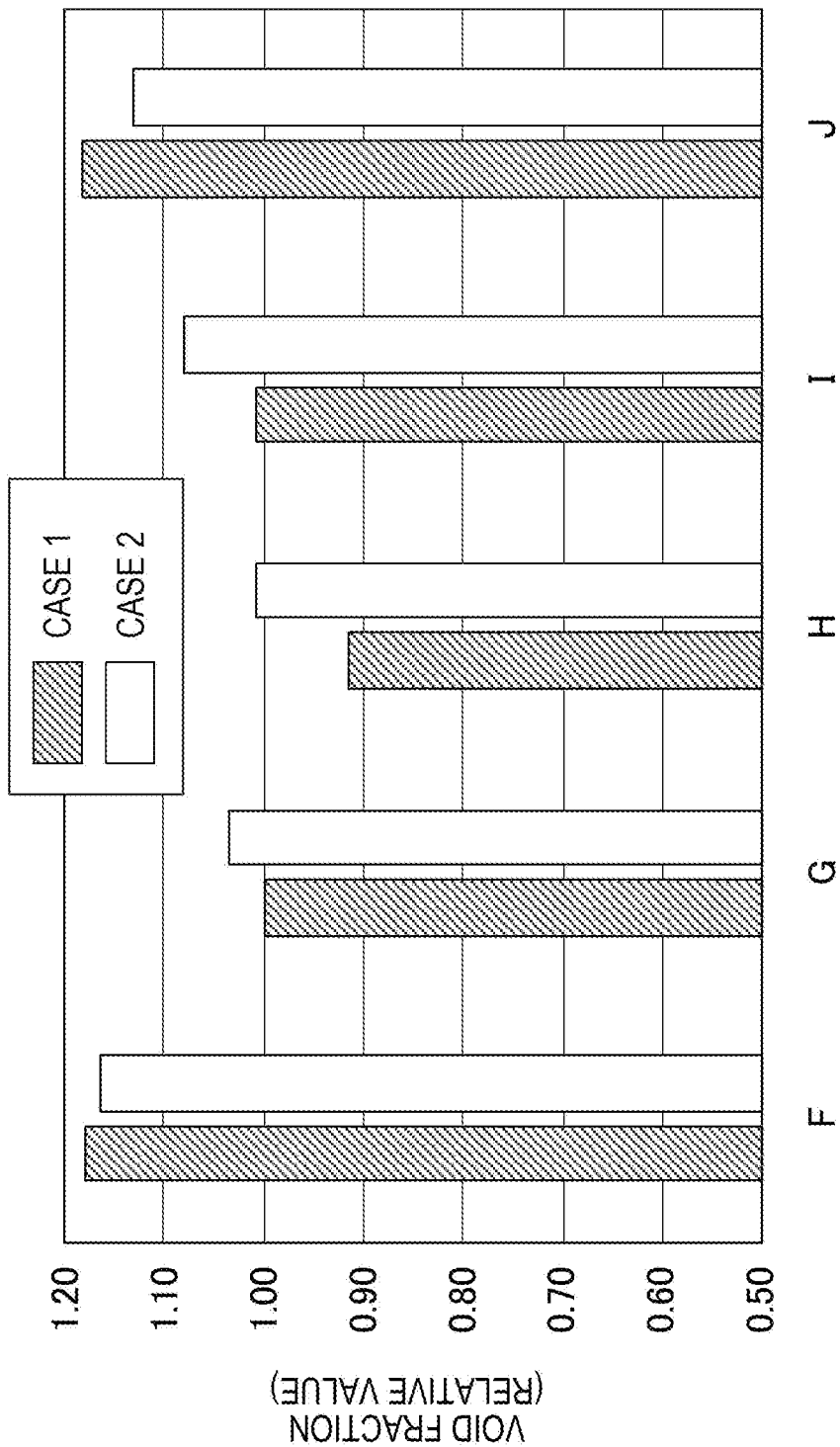
FIG. 8 is an explanatory diagram illustrating a void fraction distribution between each fuel rod disposed in the outermost periphery in the horizontal cross section of the fuel assembly and each fuel rod disposed in a second row from the inner surface of the channel box with respect to Case 1 illustrated in FIG. 5 and Case 2 illustrated in FIG. 6.

FIG. 7 illustrates the void fractions of the moderator regions A, B, C, D, and E using relative values with respect to the void fraction of the moderator region A in a case where the power of the fuel rod is equal in Case 1 and Case 2. In addition, FIG. 8 illustrates the void fraction of the moderator regions F, G, H, I, and J using relative values with respect to the void fraction of the moderator region A in a case where the power of the fuel rod is equal in Case 1 and Case 2.

In Case 1 where two partial length fuel rods are adjacent in the outermost periphery, the heat amount is significantly lowered since there is no nuclear fuel material in a region right above the partial length fuel rod.

The void fraction in the moderator regions C and H is significantly lowered, and becomes lower than the void fraction in the moderator regions C and H of Case 2 where one partial length fuel rod is disposed in the outermost periphery. In particular, the lowered degree of the void fraction of the moderator region C in Case 1 from the void fraction of the moderator region A is larger than twice the lowered degree of the void fraction of the moderator region C in Case 2 from the void fraction of the moderator region A. In addition, in Case 2, the void fraction of the moderator region H located near the center axis of the fuel assembly from the moderator region C is substantially equal to the void fraction of the moderator region A.

On the other hand, in Case 1, the void fraction of the moderator region H is lowered from the void fraction of the moderator region A.

In Case 1, the void fraction of the moderator region C between two partial length fuel rods adjacently disposed in the outermost periphery at the time of operating the boiling-water nuclear power plant is significantly reduced. In this way, the moderation of the neutrons is prompted and the thermal neutrons are generated many in the region where the void fraction is lowered (for example, the moderator region C). Therefore, if the fuel rod containing the burnable poison is disposed near the region, the worth of the burnable poison in the fuel rod can be increased.

In addition, as a secondary effect, in a case where the void fraction is averagely equal in the horizontal cross-sectional view of the fuel assembly, two partial length fuel rods are brought near to each other in the outermost periphery to lower the void fraction. Then, the void fraction is increased in regions other than the region around two partial length fuel rods (regions other than the moderator regions B, C, D, and H) in the horizontal cross-sectional view of the fuel assembly. The increase of the void fraction suppresses the nuclear fission of a fissile material contained in a nuclear fuel material. Therefore, the effective worth of the burnable poison in the fuel rod containing the burnable poison which is adjacent to the partial length fuel rod is increased. Further, the fissile material in the fuel rod containing the burnable poison and the fissile material contained in the other fuel rod adjacent to the fuel rod containing the burnable poison can be reserved.

There is a reactor shutdown margin as one of standards for securing safety of the nuclear reactor. The reactor shutdown margin makes the reactor core subcritical and makes a difference of an effective multiplication factor from a critical state even when one control rod having a maximum value of reaction is completely pulled off from the reactor core at the time of the shutdown (at the time of cooling) of the nuclear power plant. Since two partial length fuel rods are adjacently disposed in the outermost periphery in the horizontal cross-sectional view of the fuel assembly, the saturated water region is formed in a region right above the upper ends of two partial length fuel rods in the outermost periphery at the time of cooling. With the saturated water region, the saturated water region formed between the fuel assemblies is substantially expanded. The saturated water region adjacent to the control rod is increased. Therefore, the reactor shutdown margin of the nuclear reactor is improved.

Further, the inventors have studied a layout position of the partial length fuel rod in the outermost periphery in the horizontal cross-sectional view of the fuel assembly. The outermost periphery faces the saturated water region which exists between the fuel assemblies. The fuel rod disposed in the outermost periphery is supplied with the more thermal neutrons than the other fuel rod disposed in the region other than the outermost periphery in the horizontal cross-sectional view of the fuel assembly. In other words, more energy can be generated by less nuclear fuel material. A place where the effect is maximized is a corner of the outermost periphery. There is no nuclear fuel material in the upper portion of the fuel assembly in the layout position of the partial length fuel rod. Therefore, if the effect is not obtained, it will be a loss of the effective multiplication factor. In sides connecting a corner in the outermost periphery and other corners adjacent to the corner, the loss of the effective multiplication factor is reduced at a position (the center point of the side in the outermost periphery) far away from both corners. Therefore, in order to minimize the loss of the effective multiplication factor, the partial length fuel rod is desirably located at the center of the side in the outermost periphery which is a position far away from these corners in the sides connecting one corner in the outermost periphery and the other corners adjacent to the corner.

Embodiments of the invention onto which the studied results are reflected will be described below using the drawings.

Further, the fuel assembly of the following embodiment will be described as an example which is applied to an advanced boiling-water nuclear power plant (ABWR plant) equipped with an internal pump. However, the invention is not limited to the ABWR plant. For example, the fuel assembly of the following embodiment may be applied to a recirculation system which includes a recirculation pump and a recirculation system pipe, a normal boiling-water nuclear power plant (BWR plant) which includes a jet pump, a natural-circulation boiling-water nuclear power plant which is provided with a chimney and cools down the reactor core by naturally recirculating a coolant.

First Embodiment

A fuel assembly of a first embodiment applied to the advanced boiling-water nuclear power plant which is a preferred embodiment of the invention will be described using FIGS. 1, 2, and 3.

Figure 4:
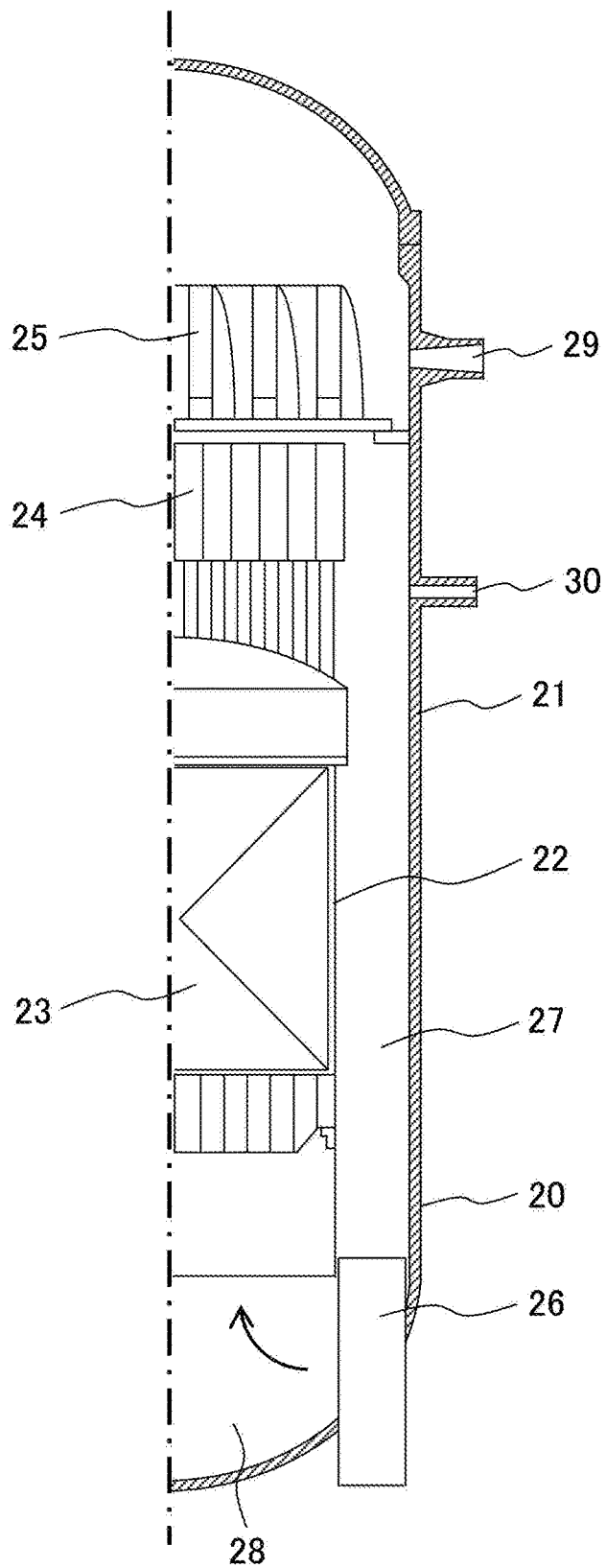
FIG. 4 is a vertical cross-sectional view of a nuclear reactor of the advanced boiling-water nuclear power plant in which the fuel assembly illustrated in FIG. 1 is loaded.

Before starting the description of the fuel assembly of this embodiment, the structure of the nuclear reactor of the advanced boiling-water nuclear power plant (ABWR plant) to which the fuel assembly is applied will be schematically illustrated on the basis of FIG. 4. The nuclear reactor 20 includes a reactor pressure vessel 21. The reactor core 23 loaded with a plurality of fuel assemblies (not illustrated) is disposed in the reactor pressure vessel 21. In the reactor pressure vessel 21, a cylindrical core shroud 22 surrounds the reactor core 23. A separator 24 disposed on the upper side of the reactor core 23 is disposed at the upper end of the core shroud 22. Further, a steam dryer 25 is disposed on the upper side of the separator 24 to be provided in the inner surface of the reactor pressure vessel 21. A circular downcomer 27 is formed between the outer surface of the core shroud 22 and the inner surface of the reactor pressure vessel 21. An internal pump 26 disposed in the downcomer 27 passes through the bottom of the reactor pressure vessel 21 and extends toward the lower side, and is attached to the reactor pressure vessel 21. A main steam pipe 29 and a water feeding pipe 30 are connected to the reactor pressure vessel 21.

Further, while not illustrated in FIG. 4, a lower plenum 28 is formed on the lower side of the reactor core 23 in the reactor pressure vessel 21. In the lower plenum 28, a plurality of control rod guiding pipes is disposed. A plurality of control rods 31 (see FIG. 1) which controls the nuclear reaction of a fuel assembly 10 and is a cross shape in the horizontal cross-sectional view are individually disposed in the control rod guiding pipes. A plurality of control rod drive mechanism housing (not illustrated) is attached to the bottom of the reactor pressure vessel 21, and extends from the bottom toward the lower side. A control rod drive mechanism (not illustrated) is disposed in the control rod drive mechanism housing, and connected to the control rod 31.

Figure 3:
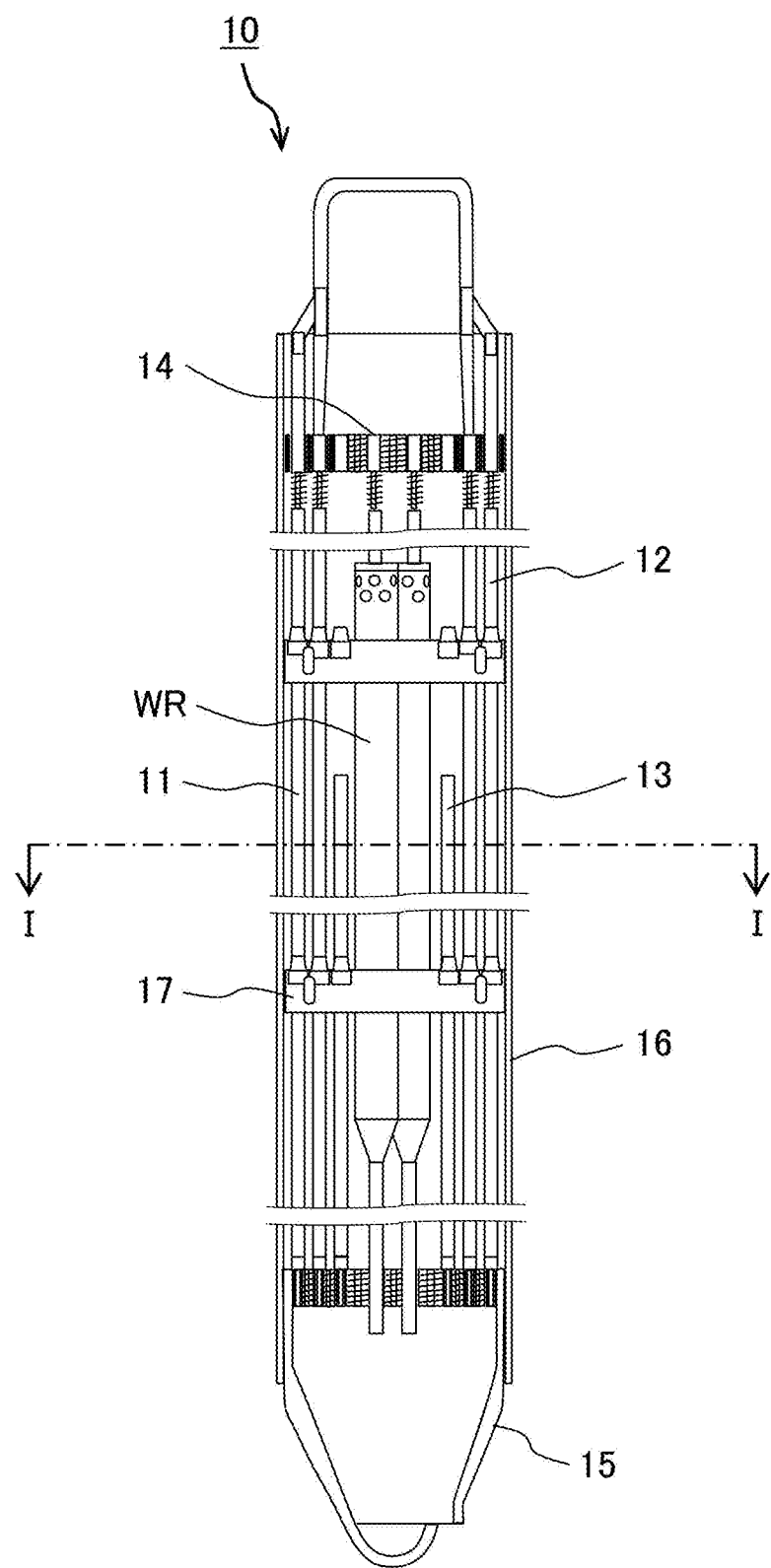
FIG. 3 is a vertical cross-sectional view of the fuel assembly illustrated in FIG. 1.

A plurality of fuel assemblies 10 loaded to the reactor core 23 includes, as illustrated in FIG. 3, a plurality of fuel rods 11, an upper tie plate (upper fuel support member) 14, a lower tie plate 15 (lower fuel support member), a plurality of fuel spacers 17 which is disposed in the axial direction, and a channel box 16. The plurality of fuel rods 11 includes a plurality of fuel rods 12 of which the lower end is supported to the lower tie plate 15 and the upper end is supported to the upper tie plate 14, and a plurality of partial length fuel rods 13 of which the length in the axial direction is shorter than that of the fuel rod (hereinafter, conveniently referred to as a full length fuel rod) 12 and the lower end is supported to the lower tie plate 15 so that the upper end is not supported to the upper tie plate 14.

The full length fuel rod 12 and the partial length fuel rod 13 include a fuel clad (not illustrated). The lower end of the fuel clad is sealed with a lower end plug (not illustrated) to seal the upper end of the fuel clad with an upper end plug (not illustrated). A plurality of fuel pellets (not illustrated) containing the nuclear fuel material is filled in the fuel clad. In the fuel clad, the gas plenum (not illustrated) is formed on the upper side of the region where the fuel pellets are filled.

In this embodiment, a plurality of full length fuel rods 12 includes the plurality of fuel rods which contains the nuclear fuel material, but does not contain the burnable poison, and the fuel rod which contains the nuclear fuel material and the burnable poison. The plurality of partial length fuel rods is the former plurality of fuel rods which contains the nuclear fuel material, but does not contain the burnable poison.

Figure 2:
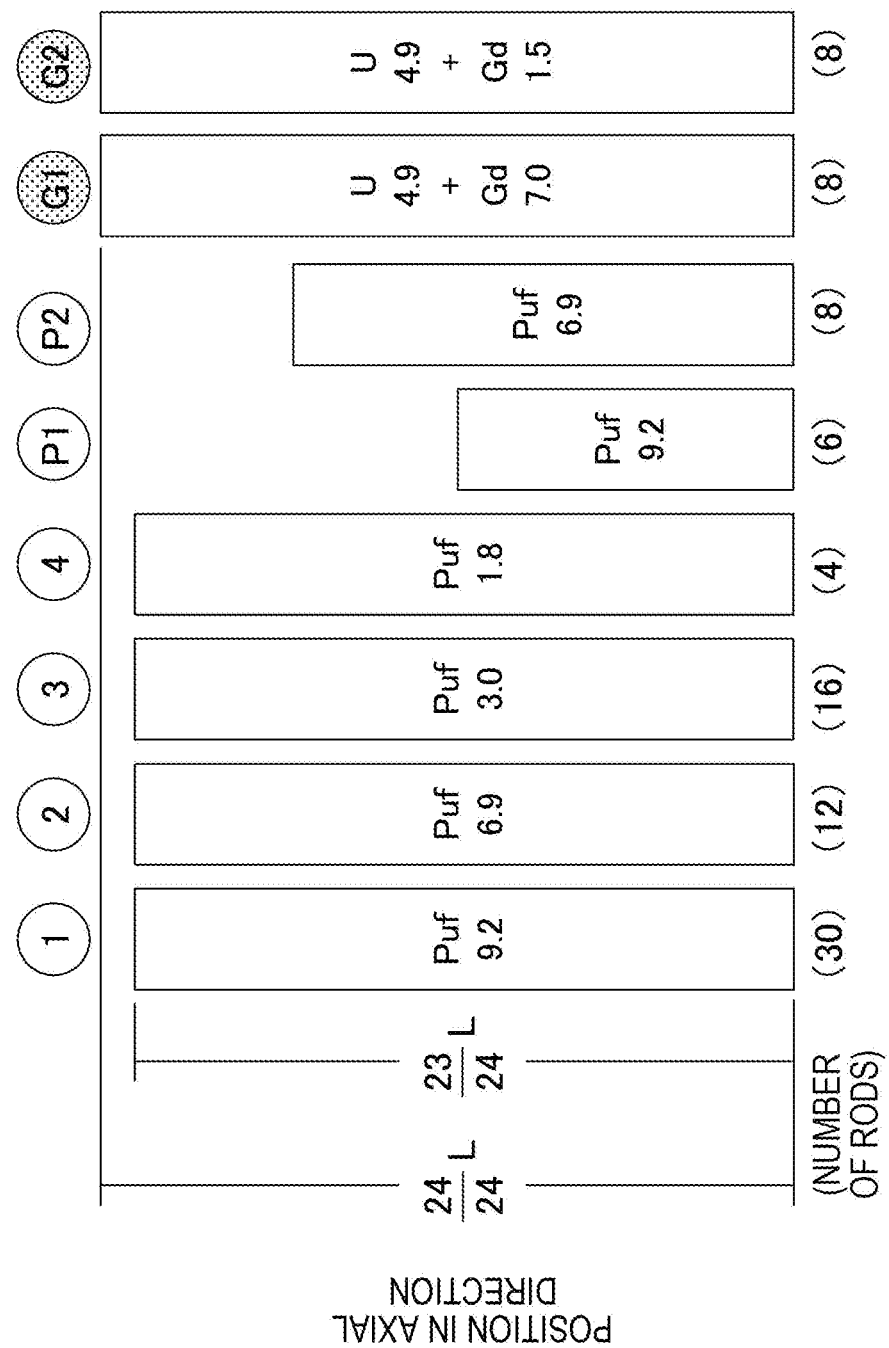
FIG. 2 is an explanatory diagram illustrating a plutonium fissile enrichment of each fuel rod of the fuel assembly illustrated in FIG. 1 and a concentration of a burnable poison.

Two water rods WR are disposed at the center of the horizontal cross-sectional view of the fuel assembly 10, and surrounded by the plurality of fuel rods 11 (see FIG. 1). The lower ends of these water rods WR are supported by the lower tie plate 15, and the upper ends thereof are supported by the upper tie plate 14. All the fuel rods 11 and two water rods WR are bound by the plurality of fuel spacers 17 which are disposed with a predetermined interval therebetween in the axial direction of the fuel rod 11 so as to form a space with a predetermined width is formed between the fuel rods 11 and between the water rod WR and the fuel rod 11 adjacent thereto. The bundle of the fuel rods 11 and the water rods WR bound by the plurality of fuel spacers 17 is disposed in the channel box 16 of which the horizontal cross-sectional view is a rectangular cylinder of a square shape. Further, the spaces with a predetermined width formed between the fuel rods 11 and between the water rod WR and the fuel rods adjacent thereto serve as a coolant passage in which the coolant flows.

The channel box 16 is configured such that the upper end thereof is attached to the upper tie plate 14, and extends from the upper tie plate 14 toward the lower tie plate 15. The channel box 16 surrounds the side surfaces from the upper tie plate 14 to the lower tie plate 15.

A handle is provided in the upper tie plate 14. When the fuel assembly 10 is transferred between the reactor core 23 and a fuel storage pool (not illustrated), the handle is gripped by a fuel exchanger (not illustrated).

The fuel assembly 10 is configured, as illustrated in FIG. 1, to dispose the plurality of fuel rods 11 in the channel box 16 in a 10×10 square grid pattern in the horizontal cross-sectional view of the fuel assembly 10. The plurality of fuel rods 11 includes full length fuel rods 1 to 4, G1, and G2 which are the full length fuel rods 12, and includes partial length fuel rods P1 and P2 which are the partial length fuel rods 13. The full length fuel rods 1 to 4 and the partial length fuel rods P1 and P2 are fuel rods which contain the nuclear fuel material but do not contain the burnable poison. The full length fuel rods G1 and G2 are fuel rods which contain the nuclear fuel material and the burnable poison. The nuclear fuel materials of the full length fuel rods 1 to 4 and the partial length fuel rods P1 and P2 include a plutonium fissile (Puf) (for example, Pu-239 and Pu-241, etc.). The nuclear fuel materials of the full length fuel rods G1 and G2 contain fissile uranium (for example, U-235) but do not contain plutonium. The full length fuel rods G1 and G2 contain gadolinia ($Gd_2O_3$) containing gadolinium (Gd) which is a burnable poison. The fuel assembly 10 includes, as illustrated in FIG. 2, thirty full length fuel rods 1, twelve full length fuel rods 2, sixteen full length fuel rods 3, four full length fuel rods 4, eight full length fuel rods G1 and G2, six partial length fuel rods P1, and eight partial length fuel rods P2.

Compositions of the nuclear fuel material and the burnable poison of each of the full length fuel rods 1 to 4, G1, and G2, and the partial length fuel rods P1 and P2 will be described using FIG. 2.

The plutonium fissile enrichment of the full length fuel rod 1 is 9.2 wt %. The plutonium fissile enrichment of the full length fuel rod 2 is 6.9 wt %. The plutonium fissile enrichment of the full length fuel rod 3 is 3.0 wt %. The plutonium fissile enrichment of the full length fuel rod 4 is 1.8 wt %. The plutonium fissile enrichment of the partial length fuel rod P1 is 9.2 wt %. The plutonium fissile enrichment of the partial length fuel rod P2 is 6.9 wt %. The length in the axial direction of the partial length fuel rod P1 is shorter than the length in the axial direction of the partial length fuel rod P2. In the full length fuel rod G1, a uranium enrichment is 4.9 wt %, and the concentration of gadolinium (Gd) which is the burnable poison is 7.0 wt %. In the full length fuel rod G2, the uranium enrichment is 4.9 wt % same as the full length fuel rod G1, and the concentration of gadolinium (Gd) is 1.5 wt %. Further, the average enrichment of the plutonium fissile in the horizontal cross-sectional view of the fuel assembly 10 is 5.3 wt % between the upper end of the partial length fuel rod P2 and the upper end of the active fuel lengths of the full length fuel rods 1 to 4. In addition, the average enrichment of the plutonium fissile in the horizontal cross-sectional view of the fuel assembly 10 on the lower side from the upper end of the partial length fuel rod P2 is 6.9 wt %.

The full length fuel rods 1 to 4, G1, and G2 have the same length from the lower end supported by the lower tie plate 15 (that is, the lower end of the lower end plug) to the upper end supported by the upper tie plate 14 (that is, the upper end of the upper end plug).

The lengths in the axial direction of the active fuel lengths of the full length fuel rods 1 to 4 are the same in the full length fuel rods 1 to 4, and are shorter than the lengths in the axial direction of the active fuel lengths of the full length fuel rods G1 and G2 by 1/24 of the length L in the axial direction of the active fuel lengths of the full length fuel rods G1 and G2 (that is, L/24). The lengths in the axial direction of the active fuel lengths of the full length fuel rods G1 and G2 are the same. The length L in the axial direction of the active fuel lengths of the full length fuel rods G1 and G2 is 3.7 m. The active fuel length of each of the full length fuel rods 1 to 4 is shorter than those of the full length fuel rods G1 and G2 by L/24, and the length in the axial direction of the gas plenum formed in the fuel rod becomes longer than those of the full length fuel rods G1 and G2. The active fuel length is a length in the axial direction of the fuel rod of the region which is filled with the nuclear fuel material in the fuel rod. Further, the active fuel length of the partial length fuel rod P1 is shorter than the active fuel lengths of the full length fuel rods 1 to 4.

The full length fuel rods 1 to 4, G1, and G2, the partial length fuel rods P1 and P2, and two water rods WR are disposed in the horizontal cross-sectional view of the fuel assembly 10 as illustrated in FIG. 1. Each water rod WR occupies a region where four fuel rods 11 can be disposed in the horizontal cross-sectional view of the fuel assembly 10.

In the reactor core 23 where the plurality of fuel assemblies 10 is loaded, one control rod 31 is actually disposed with respect to four fuel assemblies 10 which are adjacent to each other. One control rod 31 is inserted between four adjacent fuel assemblies 10. The power of the nuclear reactor is controlled by inserting and pulling out the control rod 31 to and from between the fuel assemblies. In the four adjacent fuel assemblies 10, one of four corners existing in the horizontal cross-sectional view of each fuel assembly 10 faces the control rod 31.

The channel box 16 is attached to the upper tie plate 14 by a channel fastener (not illustrated). The channel fastener is disposed in one corner facing the control rod 31 among the four corners of each fuel assembly 10 loaded to the reactor core 23. The channel fasteners disposed in the respective corners of the four adjacent fuel assemblies 10 come into contact with each other, and keep a gap between the adjacent fuel assemblies 10 at a predetermined width such that the control rod 31 can be inserted between the four fuel assemblies 10.

In the horizontal cross-sectional view of the fuel assembly 10, thirty-six fuel rods 11 which are adjacent to the inner surface of the channel box 16 are disposed in a first row in the outermost periphery of a square shape. In other words, the region where all the fuel rods 11 are disposed in the first row from the inner surface of the channel box 16 is the outermost periphery in the horizontal cross-sectional view of the fuel assembly 10. At each of the four corners of the outermost periphery (which exist at four corners in the horizontal cross-sectional view of the fuel assembly 10), the full length fuel rods 1 to 4 containing the plutonium fissile and one full length fuel rod 4 which has a smallest plutonium fissile enrichment among the partial length fuel rods P1 and P2 are disposed. A straight line connecting the adjacent corners of the outermost periphery, specifically, a straight line connecting the centers in the horizontal cross-sectional view of the full length fuel rods 4 which are disposed at the adjacent corners is called a side of the outermost periphery. In the outermost periphery of a square shape, four sides exist.

In the outermost periphery, two partial length fuel rods P2 are disposed to be adjacent to each other near the center point of each side (that is, the center). In the fuel assembly 10, eight full length fuel rods G1 containing the burnable poisons are all disposed in the outermost periphery, and two full length fuel rods G1 are disposed each side of the outermost periphery. Further, in each side, each full length fuel rod G1 is disposed to be adjacent to the each of the partial length fuel rods P2 on the corner side. No fuel rod 11 exists between the two adjacent partial length fuel rods P2. The full length fuel rod G2 is disposed at each of four corners of the layout of the fuel rods of the second row from the inner surface of the channel box 16. The remaining four full length fuel rods G2 are disposed two by two to be adjacent to each water rod WR.

Two water rods WR are disposed on a diagonal passing through two corners which is intersecting with another diagonal passing through one corner facing the control rod 31 of the fuel assembly 10. The partial length fuel rods P1 are adjacently disposed three by three as illustrated in FIG. 1. Two partial length fuel rod groups in which three partial length fuel rods P1 are disposed on the diagonal passing through one corner facing the control rod 31 with two water rods WR interposed therebetween, and are disposed adjacent to two water rods WR individually.

The coolant discharged from the internal pump 26 is supplied to the reactor core 23 through the lower plenum 28. In the reactor core 23, the coolant is guided into the fuel assembly 10. In other words, the coolant flows into the channel box 16 through the lower tie plate 15, and raises the coolant passages which are formed between the fuel rods 11 and between the fuel rod 11 and the water rod WR. During the raising of the coolant passage, the coolant is heated up by heat generated by the nuclear fission of the fissile material (a plutonium fissile or a fissile uranium) contained in the nuclear fuel material in the fuel rod 11. Part of the coolant becomes steam, and the coolant becomes a gas-liquid two-phase flow which contains water and steam.

The gas-liquid two-phase flow is discharged from the upper end of the fuel assembly 10 (that is, the reactor core 23), and flows into the gas-water separator 24. The gas-liquid two-phase flow is separated into water and steam by the gas-water separator 24. The separated water is discharged from the gas-water separator 24 to the downcomer 27, and flows down through the downcomer 27 as the coolant to be raised by the internal pump 26. The separated steam is guided from the gas-water separator 24 to the steam dryer 25, and moisture in the steam dryer 25 is removed. The steam discharged from the steam dryer 25 with the moisture removed is guided to a steam turbine (not illustrated) through the main steam pipe 29, and rotates the steam turbine. A power generator connected to the steam turbine is rotated, and generates power. The steam discharged from the steam turbine is condensed by a steam condenser (not illustrated) and becomes water. The condensed water is supplied into the reactor pressure vessel 21 by the water feeding pipe 30.

In this embodiment, two partial length fuel rods P1 are adjacently disposed in the outermost periphery of the fuel assembly, and the full length fuel rod containing one burnable poison is disposed adjacent to each of these partial length fuel rods P1. Therefore, as described above, the void fraction at the time of operation of the ABWR plant in the region where two partial length fuel rods P1 are disposed in the outermost periphery is significantly reduced compared to the other region in the outermost periphery and the region where the fuel rods in the second row from the inner surface of the channel box are disposed. In this way, in the region where the void fraction is lowered and the two partial length fuel rods P1 are disposed, the moderation of the neutrons is enhanced and many thermal neutrons are generated. Therefore, the neutrons absorption effect can be increased by the burnable poison (gadolinium) of each of the full length fuel rods G1 disposed adjacent to two partial length fuel rods P1. The worth of the burnable poison contained in each of the full length fuel rods G1 can be further increased. This embodiment can significantly increase the worth of the burnable poison compared to the fuel assembly disclosed in JP 2002-189094 A and JP 2001-56388 A in which the partial length fuel rod containing one fissile material in the outermost periphery but not containing the burnable poison is disposed and two full length fuel rods containing the burnable poison are disposed adjacent to the partial length fuel rod. In addition, in the region which is right above two adjacent partial length fuel rods P2 and on the upper side from the upper end of these partial length fuel rods P2, the void fraction is lowered, and the thermal neutrons are generated. Therefore, the worth of the burnable poison in each of the full length fuel rods disposed to be adjacent to the partial length fuel rods is increased more.

In this embodiment, two partial length fuel rods P2 are adjacently disposed in the outermost periphery in the horizontal cross-sectional view of the fuel assembly 10. Therefore, at the time of cooling, the saturated water region is formed in the region right above the upper ends of two partial length fuel rods P2 in the outermost periphery. With the saturated water region, the saturated water region formed between the fuel assemblies 10 are substantially expanded, and the saturated water region adjacent to the control rod is increased in the reactor core 23. Therefore, the reactor shutdown margin of the nuclear reactor 20 is improved.

In sides connecting a corner in the outermost periphery and other corners adjacent to the corner, the loss of the effective multiplication factor is reduced at a position (the center point of the side in the outermost periphery) far away from both corners. Therefore, the partial length fuel rod is desirably located at the center of the side in the outermost periphery which is a position far away from these corners in the sides connecting one corner in the outermost periphery and the other corners adjacent to the corner, so that the loss of the effective multiplication factor can be minimized.

In this embodiment, two partial length fuel portion groups including three partial length fuel rods P1 are disposed to interpose two water rods WR to be adjacent to two water rods WR. Therefore, the coolant amount in the region right above these partial length fuel portion groups is increased, and the generation of the thermal neutrons is increased by the moderation of the neutrons caused by the increase of the coolant amount. Therefore, the power in the portion (the upper region of the full length fuel rod 1) adjacent to the region right above the partial length fuel portion group in a plurality of full length fuel rods 1 which are adjacent to the partial length fuel portion group is increased. Therefore, the power of the upper portion in the axial direction of the fuel assembly 10 is increased, and the power distribution in the axial direction of the fuel assembly 10 is planarized.

Second Embodiment

Figure 9:
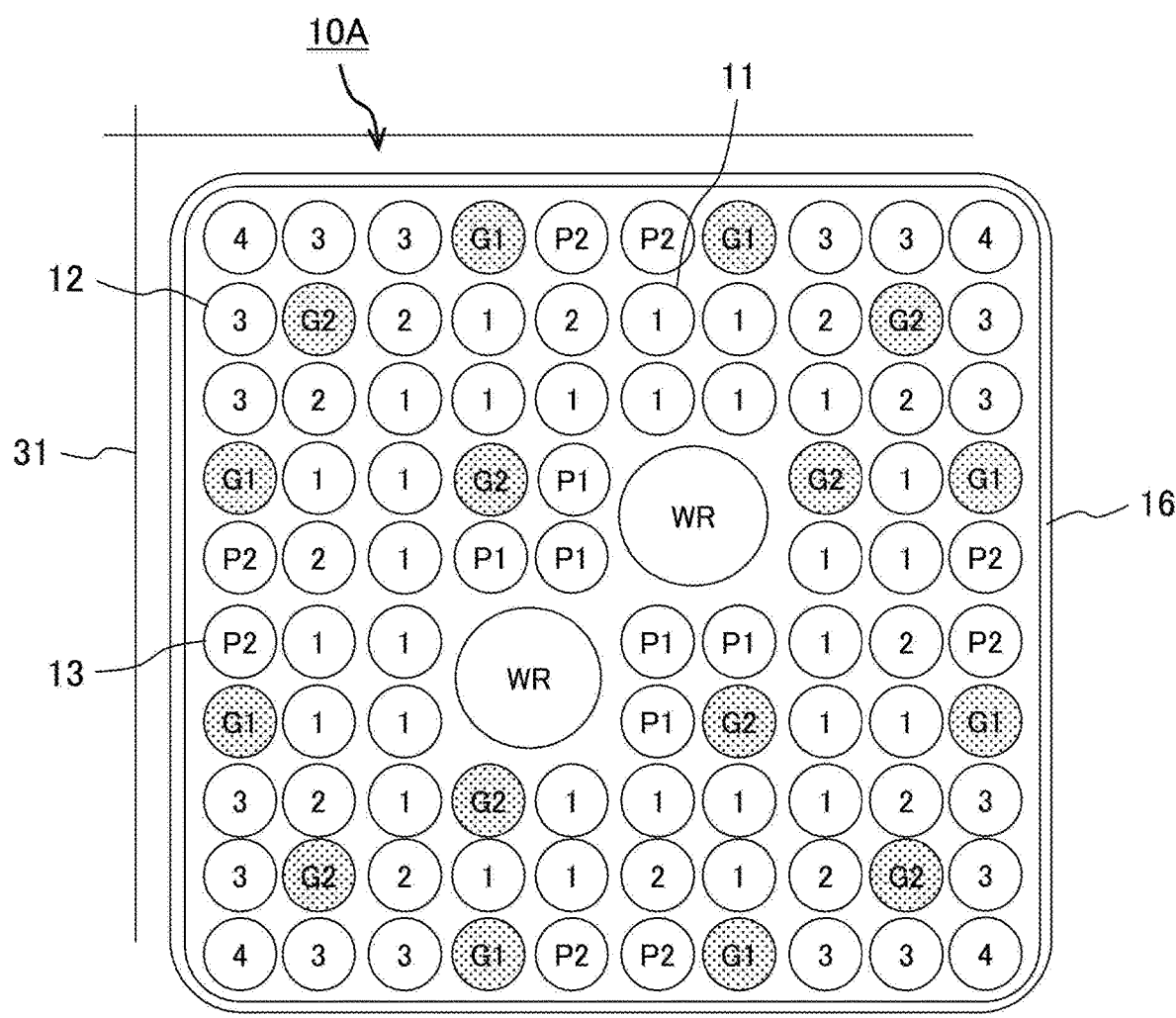
FIG. 9 is a horizontal cross-sectional view of the fuel assembly of a second embodiment applied to the advanced boiling-water nuclear power plant which is another preferred embodiment of the invention.
Figure 10:
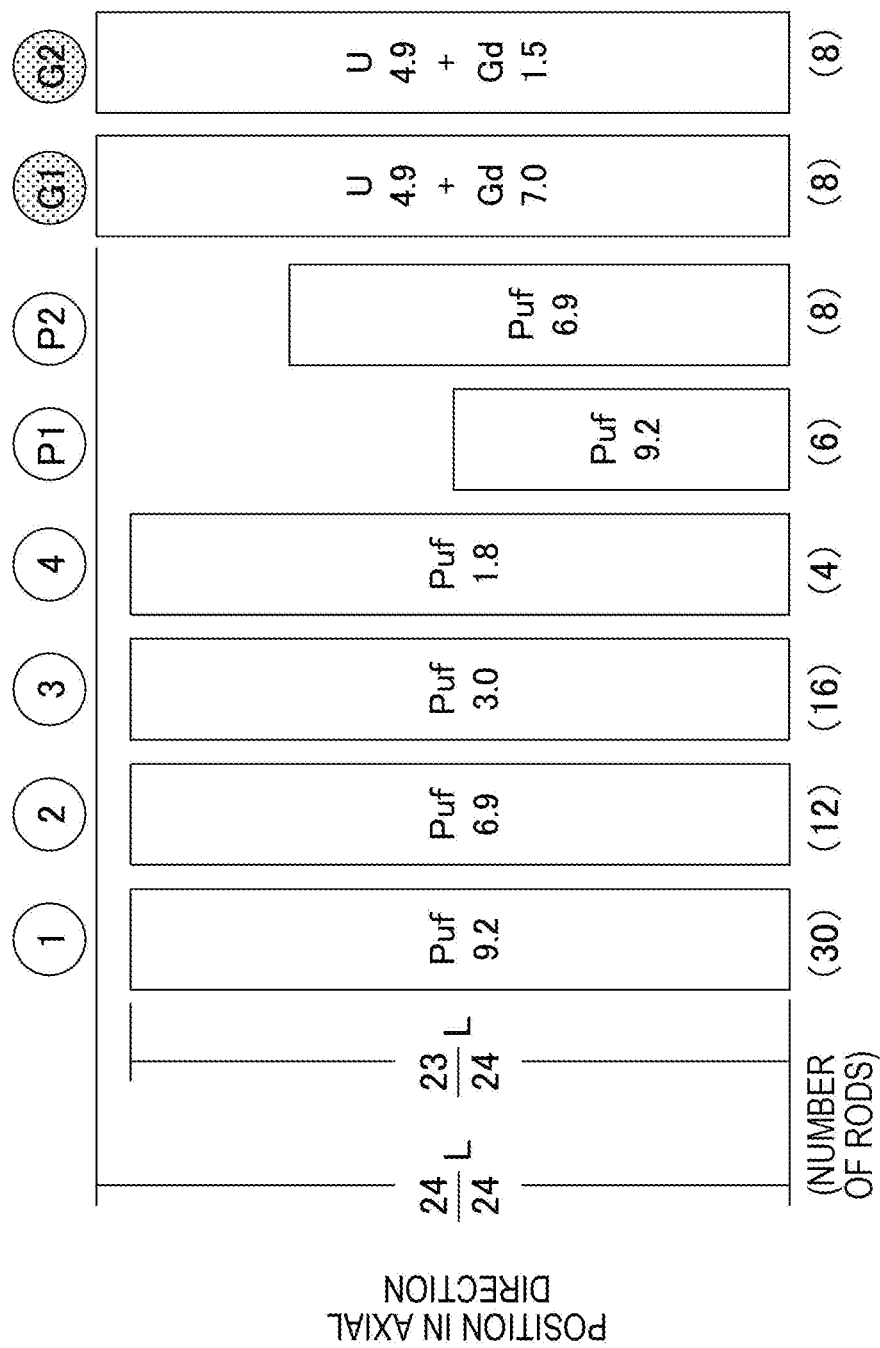
FIG. 10 is an explanatory diagram illustrating the plutonium fissile enrichment of each fuel rod of the fuel assembly illustrated FIG. 9 and the concentration of the burnable poison.

A fuel assembly of a second embodiment applied to the ABWR plant which is another preferred embodiment of the invention will be described using FIGS. 9 and 10.

A fuel assembly 10A of this embodiment is configured such that one full length fuel rod G2 in two full length fuel rods G2 disposed to be adjacent to each of two water rods WR of the fuel assembly 10 of the first embodiment is disposed to be adjacent to three partial length fuel rods P2 of the partial length fuel rod group in each of two partial length fuel rod groups adjacent to two water rods WR. In each of the two partial length fuel rod groups of the fuel assembly 10, the full length fuel rod 1 disposed to be adjacent to three partial length fuel rods P2 is disposed to be adjacent to the water rod WR. In other words, in the fuel assembly 10A, the full length fuel rods G2 adjacent to the water rod WR is less than the fuel assembly 10 by one, and the full length fuel rods 1 is more by one. One full length fuel rod G2 is disposed to be adjacent to three partial length fuel rods P2 of the partial length fuel rod group in each of two partial length fuel rod groups which are adjacent to two water rods WR.

The fuel assembly 10A includes, similarly to the fuel assembly 10, thirty full length fuel rods 1, twelve full length fuel rods 2, sixteen full length fuel rods 3, four full length fuel rods 4, eight full length fuel rods G1 and G2, six partial length fuel rods P1, and eight partial length fuel rods P2. The layout of all the fuel rods 11 other than one full length fuel rod 1 and one full length fuel rod G2 of the fuel assembly 10A, that is, twenty-nine full length fuel rods 1, twelve full length fuel rod 2, sixteen full length fuel rods 3, four full length fuel rods 4, eight full length fuel rods G1, seven full length fuel rods G2, six partial length fuel rods P1, and eight partial length fuel rods P2 is the same as that of the fuel assembly 10.

This embodiment can achieve the effects of the first embodiment. Further, in this embodiment, the full length fuel rod G1 containing the burnable poison is disposed to be adjacent to two adjacent partial length fuel rods P2 in the outermost periphery of the first embodiment, and also two full length fuel rods G2 containing the burnable poison is disposed to be adjacent to three partial length fuel rods P2 of each of two partial length fuel rod groups, so that the worth of the burnable poison at the time of operating the ABWR plant can be increased. Therefore, in this embodiment, the full length fuel rod G1 containing the burnable poison is disposed to be adjacent to two adjacent partial length fuel rods P2 in the outermost periphery, and two full length fuel rods G2 containing the burnable poison is disposed to be adjacent to three partial length fuel rods P2 of each of two partial length fuel rod groups, so that the worth of the burnable poison at the time of operating the ABWR plant can be increased. Therefore, the worth of the burnable poison at the time of operating the ABWR plant can be increased more than the first embodiment.

Third Embodiment

Figure 11:
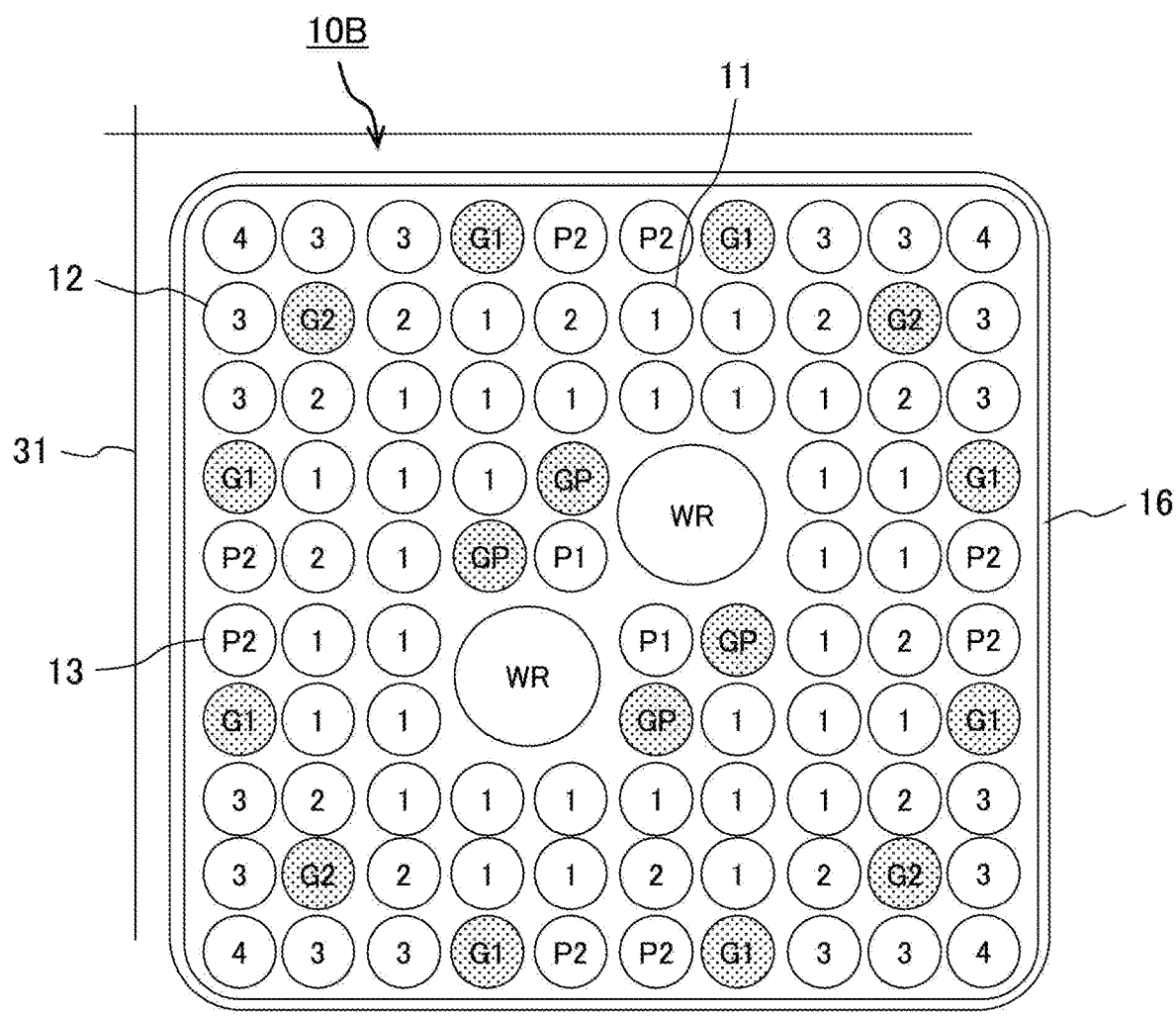
FIG. 11 is a horizontal cross-sectional view of the fuel assembly of a third embodiment applied to the advanced boiling-water nuclear power plant which is another preferred embodiment of the invention.
Figure 12:
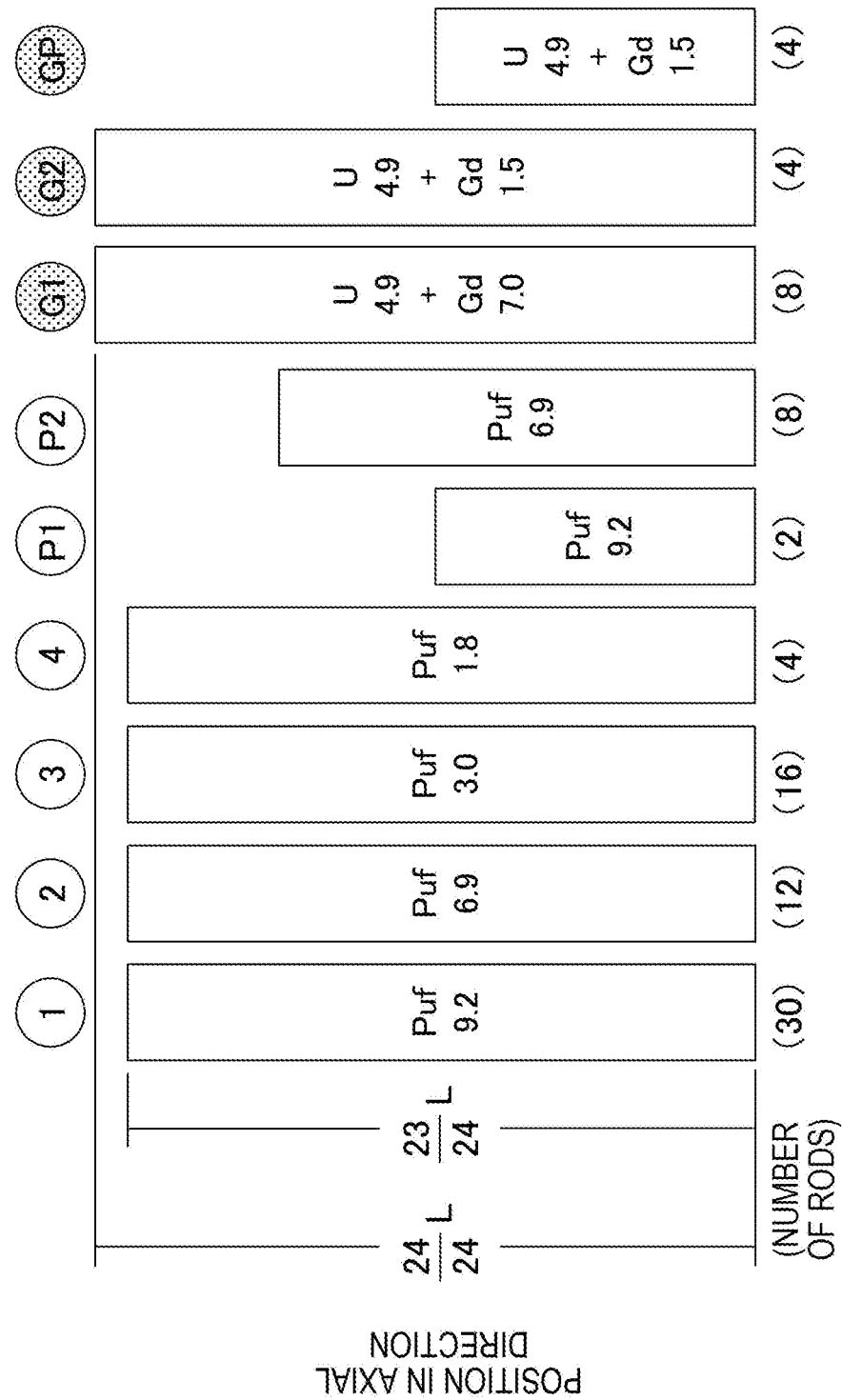
FIG. 12 is an explanatory diagram illustrating the plutonium fissile enrichment of each fuel rod of the fuel assembly illustrated FIG. 11 and the concentration of the burnable poison.

A fuel assembly of a third embodiment applied to the ABWR plant which is another preferred embodiment of the invention will be described using FIGS. 11 and 12.

A fuel assembly 10B of this embodiment is configured to include four partial length fuel rods GP instead of four partial length fuel rods P1 used in the fuel assembly 10 of the first embodiment, and the full length fuel rods G2 is reduced by four from the fuel assembly 10. In the fuel assembly 10B, four full length fuel rods G2 are disposed at four corners of the fuel rod layout of the second row from the inner surface of the channel box 16. The partial length fuel rod GP contains the nuclear fuel material and the burnable poison. The nuclear fuel material in the partial length fuel rod GP does not contain plutonium, but contains fissile uranium (for example, U-235) and a non-fissile uranium (for example, U-238). In the partial length fuel rod GP, the uranium enrichment is 4.9 wt %, and the concentration of gadolinium is 1.5 wt % (see FIG. 12). The active fuel length of the partial length fuel rod GP is substantially equal to the active fuel length of the partial length fuel rod P1.

Two partial length fuel rod groups of this embodiment are disposed similarly to the fuel assembly 10, and each of two partial length fuel rod groups includes one partial length fuel rod P1 and two partial length fuel rods GP. Two partial length fuel rods GP are adjacent to each of one partial length fuel rod P1 and two water rods WR. The layout of the fuel rods 11 other than four partial length fuel rods GP, that is, thirty full length fuel rods 1, twelve full length fuel rods 2, sixteen full length fuel rods 3, four full length fuel rods 4, eight full length fuel rods G1, four full length fuel rods G2, two partial length fuel rods P1, and eight partial length fuel rods P2 is the same as that of the fuel assembly 10.

This embodiment can achieve the effects of the first embodiment. Further, the burnable poison contained in each partial length fuel rod GP operates as a neutron absorber in the lower region in the axial direction of the fuel assembly 10B. Therefore, the thermal neutrons generated in the lower region having a low void fraction are efficiently absorbed. With this configuration, the power of the lower region in the axial direction of the fuel assembly 10B can be suppressed, and the power distribution in the axial direction of the fuel assembly 10B can be planarized. Therefore, in this embodiment, a thermal margin of the reactor core can be increased more than the first embodiment.

Fourth Embodiment

Figure 13:
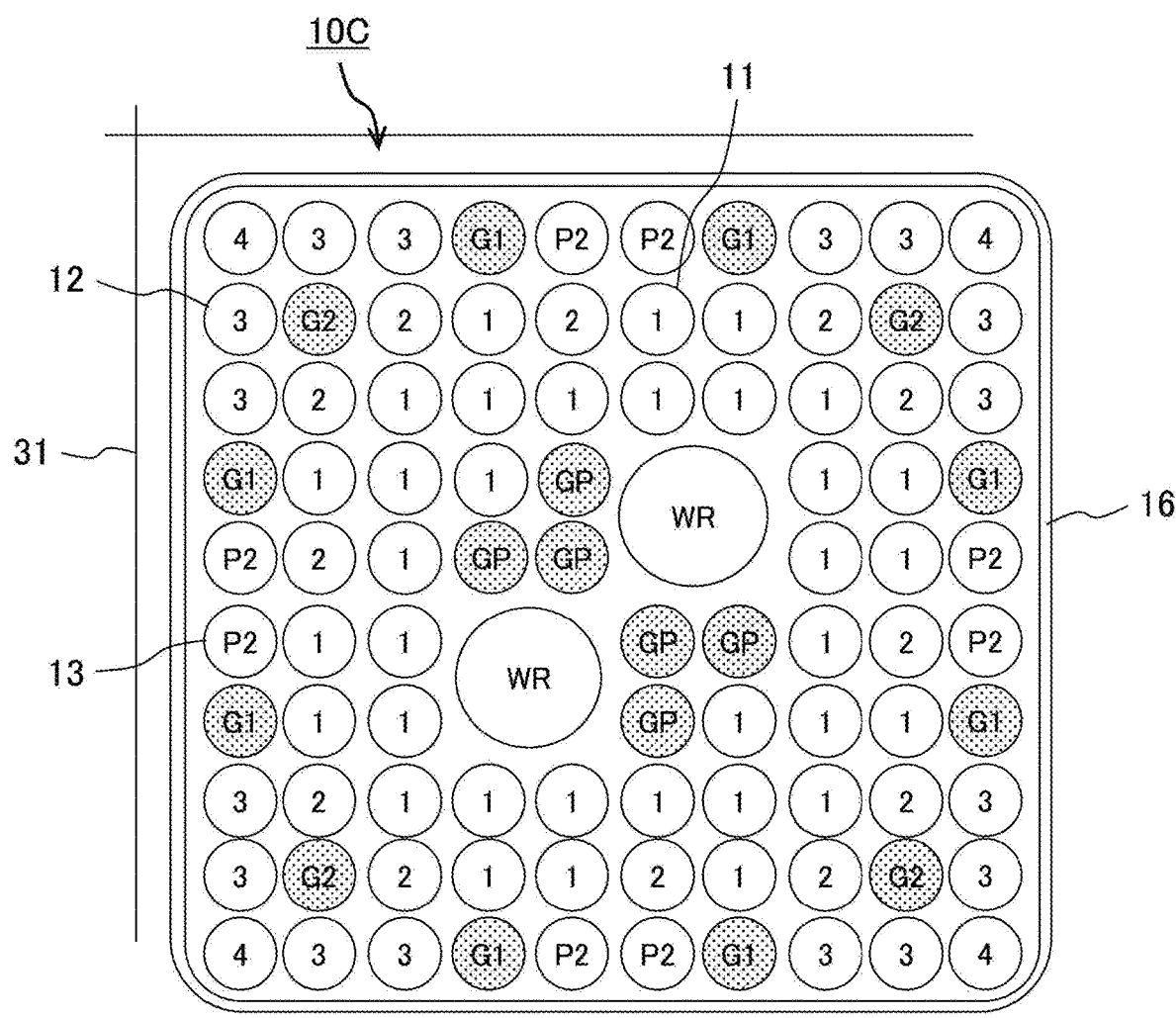
FIG. 13 is a horizontal cross-sectional view of the fuel assembly of a fourth embodiment applied to the advanced boiling-water nuclear power plant which is another preferred embodiment of the invention.

A fuel assembly of a fourth embodiment applied to the ABWR plant which is another preferred embodiment of the invention will be described using FIGS. 13 and 14.

A fuel assembly 10C of this embodiment is configured to include six partial length fuel rods GP instead of six partial length fuel rods P1 used in the fuel assembly 10 of the first embodiment, and the full length fuel rods G2 is reduced by four from the fuel assembly 10. The fuel assembly 10C does not include the partial length fuel rod P1. In the fuel assembly 10B, four full length fuel rods G2 are disposed at four corners of the fuel rod layout of the second row from the inner surface of the channel box 16. The partial length fuel rod GP does not contain plutonium, but contains uranium and the burnable poison. In the partial length fuel rod GP, the uranium enrichment is 4.9 wt %, and the concentration of gadolinium is 1.5 wt % (see FIG. 14). The active fuel length of the partial length fuel rod GP is substantially equal to the active fuel length of the partial length fuel rod P1 which is used in the fuel assembly 10.

Two partial length fuel rod groups of this embodiment are disposed similarly to the fuel assembly 10, and each of two partial length fuel rod groups includes three partial length fuel rods GP which are disposed to be adjacent to each other. Two partial length fuel rod groups in this embodiment are configured to include the partial length fuel rod GP instead of one partial length fuel rod P1 which is disposed in each partial length fuel rod group of the fuel assembly 10B of the third embodiment.

This embodiment can achieve the effects of the first embodiment. Further, the number of the partial length fuel rods GP adjacent to two water rods WR is increased more than the third embodiment. Therefore, the power of the lower region in the axial direction of the fuel assembly 10C can be suppressed more than the power of the fuel assembly 10B in the third embodiment. The power distribution in the axial direction of the fuel assembly 10C can be planarized more than the fuel assembly 10B. Therefore, in this embodiment, the thermal margin of the reactor core can be increased more than the third embodiment. In this embodiment, all the fuel rods of two partial length fuel rod groups are configured by the partial length fuel rod GP, so that a manufacturing cost of the fuel can be reduced compared to the third embodiment.

The layout of the full length fuel rod which contains the nuclear fuel material but does not contain the burnable poison in each fuel assembly of the first and second embodiments, the other full length fuel rods which contain the nuclear fuel material and the burnable poison, and the partial length fuel rod which contains the nuclear fuel material but does not contain the burnable poison, and the layout of the full length fuel rod which contains the nuclear fuel material but does not contain the burnable poison in each fuel assembly of the third and fourth embodiments, the other full length fuel rods which contain the nuclear fuel material and the burnable poison, the partial length fuel rod which contains the nuclear fuel material but does not contain the burnable poison, and the other partial length fuel rods which contain the nuclear fuel material and the burnable poison each can be applied to the fuel assembly using the nuclear fuel material which contains the fissile uranium but does not contain the plutonium fissile.

In the first to fourth embodiments, one full length fuel rod containing the burnable poison is disposed to be adjacent to each of two adjacent partial length fuel rods which contain the fissile material but does not contain the burnable poison in four sides of the outermost periphery. However, one full length fuel rod containing the burnable poison may be disposed to be adjacent to each of two adjacent partial length fuel rods which contain the fissile material but does not contain the burnable poison in two sides symmetrical to the diagonal passing through one corner facing the control rod in the horizontal cross-sectional view of the fuel assembly. In this way, even in a case where one full length fuel rod containing the burnable poison is disposed to be adjacent to each of two adjacent partial length fuel rods which contain the fissile material but does not contain the burnable poison in the two sides symmetrical to the diagonal passing through one corner facing the control rod, the worth of the burnable poison contained in the full length fuel rod is increased more than the fuel assembly of the related art disclosed in JP 2002-189094 A and JP 2001-56388 A.

Further, one full length fuel rod containing the burnable poison is disposed to be adjacent to each of two adjacent partial length fuel rods which contain the fissile material but does not contain the burnable poison in the outermost periphery. However, one full length fuel rod containing the burnable poison may be disposed to be adjacent to any one of two adjacent partial length fuel rods which contain the fissile material but not does contain the burnable poison. In this way, even in a case where one full length fuel rod containing the burnable poison is disposed to be adjacent to any one of two adjacent partial length fuel rods which contain the fissile material but does not contain the burnable poison, the worth of the burnable poison contained in the full length fuel rod is increased more than the fuel assembly of the related art disclosed in JP 2002-189094 A and JP 2001-56388 A.

What is claimed is:

1. A fuel assembly, comprising:
a lower fuel support member;
an upper fuel support member;
a channel box having a square shape in a cross section of the fuel assembly;
the channel box having an upper end attached to the upper fuel support member, and extending toward the lower fuel support member, the channel box delimiting a space, wherein a plurality of first fuel rods, a plurality of second fuel rods, a plurality of third fuel rods and a plurality of fourth fuel rods are disposed in the space, the space having an outermost periphery adjacent to an inner surface of the channel box,
the plurality of first fuel rods having a lower end supported by the lower fuel support member and an upper end supported by the upper fuel support member, containing a nuclear fuel material, and not containing a burnable poison;
the plurality of second fuel rods having a lower end supported by the lower fuel support member and an upper end supported by the upper fuel support member, and containing the nuclear fuel material and the burnable poison;
the plurality of third fuel rods having a lower end supported by the lower fuel support member and an upper end not supported by the upper fuel support member, having a length in an axial direction shorter than the plurality of first fuel rods and the plurality of second fuel rods in the axial direction, the plurality of third fuel rods containing the nuclear fuel material, and not containing the burnable poison; and
the plurality of fourth fuel rods having a lower end supported by the lower fuel support member and an upper end supported by the upper fuel support member, and containing the nuclear fuel material and the burnable poison
wherein two third fuel rods are disposed in the outermost periphery,
wherein each of the plurality of second fuel rods are disposed in the outermost periphery and each of the plurality of second fuel rods is respectively disposed adjacent to at least one of two adjacent third fuel rods in the outermost periphery,
wherein the plurality of fourth fuel rods are disposed at each corner of the channel box and adjacent to the outermost periphery, and
wherein a concentration of the burnable poison of the plurality of fourth fuel rods is lower than a concentration of the burnable poison of the plurality of second fuel rods.

2. The fuel assembly according to claim 1,
wherein the two adjacent third fuel rods are disposed at centers of sides of the channel box in the outermost periphery.

3. The fuel assembly according to claim 1, further comprising:
a water rod which has a lower end supported to the lower fuel support member and an upper end supported to the upper fuel support member, and is disposed in the channel box, wherein the plurality of first fuel rods, the plurality of second fuel rods, and the plurality of third fuel rods are disposed around the water rod, wherein the water rod is disposed between two partial length fuel rod groups which include a plurality of fifth fuel rods disposed adjacent to each other, having a lower end supported by the lower fuel support member and an upper end not supported by the upper fuel support member, and being shorter than the plurality of third fuel rods in the axial direction, wherein each of the two partial length fuel rod groups is disposed adjacent to the water rod.

4. The fuel assembly according to claim 3, wherein the plurality of fifth fuel rods contain the nuclear fuel material and do not contain the burnable poison.

5. The fuel assembly according to claim 1, wherein the plurality of first fuel rods contain the nuclear fuel material in which plutonium is contained, wherein the plurality of second fuel rods contains the nuclear fuel material in which enriched uranium is contained, and wherein the plurality of third fuel rods contain the nuclear fuel material in which plutonium is contained.

\* \* \* \* \*